United States Patent Office 3,475,189
Patented Oct. 28, 1969

3,475,189
FILLER MATERIAL FOR ACETYLENE CYLINDERS
James L. Carter, Chatham, N.J., and John E. Hofmann, Baton Rouge, La., assignors, by mesne assignments, to Coyne Cylinder Company
No Drawing. Filed Dec. 8, 1966, Ser. No. 600,025
Int. Cl. F17c 11/00
U.S. Cl. 106—118   2 Claims

ABSTRACT OF THE DISCLOSURE

A filler composition for acetylene containers consisting of lime, expanded perlite, fibrous asbestos, and water. Diatomaceous earth and charcoal are optional ingredients.

---

This invention relates to an improved filler composition of the type adapted for holding dissolved acetylene in containers at elevated pressures and further relates to the preparation and use of such filler compositions. More particularly, the invention relates to improvements in said composition which provide increased porosity, lowered density and faster drying time.

The need for the material of the present invention is created by properties peculiar to acetylene gas. It is well known that acetylene gas even in very small amounts may become violently unstable at pressures in excess of 15 p.s.i. and almost with certainty above 50 p.s.i. This condition is substantially overcome by dissolving the acetylene in acetone. The acetone dissolves as much as six times its own weight of acetylene. Pressures up to 300 p.s.i. or more of dissolved gas may be obtained in this manner if the acetone container is filled with a highly porous material of which the individual pores are minute.

In order to be usable for the above purpose, the material must be such that it will not settle, shrink or disintegrate so as to leave voids within which acetylene gas under pressure may collect and become unstable. Thus, in addition to the essential characteristic of high porosity it is most important that the porous material have a compressive strength sufficient to withstand crushing during usage and also to be dimensionally stable.

A number of materials have been developed for use as a filler for the above purpose. For example, compositions of charcoal and fibrous asbestos dispersed and set in a silica lime product are known in the art (see in this regard U.S. 2,944,911). It has also been taught that certain ratios of the ingredients are critical and when preferred limits are observed products adapted for the above purpose are obtained. In addition, the art teaches certain methods for compounding the product before using the product in filling suitable containers for holding the acetylene gas and carrier fluid.

The present invention improves upon these recent teachings by providing a product having significantly improved porosity and being of a lower density while still maintaining sufficient compressive strengths to resist the rough handling a cylinder is exposed to during its useful life.

In accordance with the present invention, it has been discovered that if the filler composition is made approximately according to the following formula these advantageous and essential properties are obtained.

Lime slurry (14.4 wt. percent CaO) _____gallons__ 92
Perlite No. 430 _____pounds__ 215
Fibrous asbestos _____do____ 90
Water _____gallons__ 117

Expressed in approximate weight percentages, the above formula would be:

|  | Weight percent |
|---|---|
| Lime | 5 |
| Perlite | 14 |
| Fibrous asbestos | 4 |
| Water | 77 |

It has been found that the use of expanded perlite as indicated above in place of part or all of the charcoal used in the prior art leads to a filler that is both more porous and less dense than conventional fillers. Perlite is a naturally occurring volcanic material that can be expanded by heating.

A typical chemical composition for this material is given by the following analysis:

|  | Weight percent |
|---|---|
| $SiO_2$ | 70 |
| $Al_2O_3$ | 20 |
| $K_2O$ | 4 |
| $Na_2O$ | 4 |
| Other oxides | 2 |

The specific material used, i.e. No. 430, is a product of the Great Lakes Carbon Company and is a mixture of their Permalite Industrial Grades No. 3 and No. 4. The particle sizes of these grades are as follows:

| Grade No. 3 | Grade No. 4 |
|---|---|
| 0–10% on 8 mesh | 30–50% on 8 mesh |
| 20–50% on 16 mesh | 70–85% on 16 mesh |
| 90–95% on 120 mesh | 90–98% on 100 mesh |

While the crushing strength of the new material may be slightly lower than conventional formulations, its compressive strength is still higher than typical specifications. Typical physical properties of a material obtained using the above indicated formulation in conjunction with the method of preparation to be herein subsequently discussed are indicated in the following table.

|  | Conventional Filler | Using Permalite No. 430 |
|---|---|---|
| Density g./cc | .255 | .213 |
| Porosity, percent | 89.2 | 92.1 |
| Crushing Strength, lbs./in | 390 | 290 |

Another unexpected advantage of the filler composition of this invention lies in the fact that the use of expanded perlite results in a greatly reduced time required to dry the mass after it had been cured. A standard cylinder using conventional filler normally takes about 20 hours to dry. With the new filler it has been found that the drying time can be reduced to six hours.

It is also to be appreciated that the increased porosity which is achieved using the teachings of the instant invention is highly desirable in that it permits more acetone to be charged to the cylinder and this in turn permits the storage of greater amounts of acetylene. Furthermore, the low density of the cured product of this invention is also desirable because it reduces the shipping weight of the cylinder. In addition to the above, it has been discovered that these advantageous properties are obtained and time saved in doing so by utilizing the following cylinder filling process which will be discussed in conjunction with the following detailed description of the practice of the invention.

After the mix is formulated according to the teachings of the instant invention and in the conventional manner, it is added to evacuated cylinders. The cylinders are hooked to a pressure manifold in a kiln and the kiln vent is left open to the atmosphere. Following this the kiln is heated to 400° F. in about a half hour, the vent on the manifold still being left open to the atmosphere. When the air temperature in the kiln is at 400° F., the kiln vent is closed and the pressure in the manifold then rises to the vapor pressure of water at 400° F., approximately 237 p.s.i. Heating is continued for about 16 hours at this temperature. After the 16 hour period the vent is opened and the cylinders are removed from the manifold. The cylinders are then dried at 400° F. to remove the balance of the water. As herein previously indicated, the new filler material can be dried in about six hours at this temperature, whereas the conventional fillers take 18 to 20 hours for the same size cylinder.

While the filler composition previously discussed contains no charcoal at all, it is also possible to maintain some charcoal content. Since the charcoal has only about 60% porosity, it is, according to this invention, highly desirable to replace at least part of the charcoal with perlite which will give a higher porosity to the filler. It is to be appreciated that prior to its incorporation into the mix, this perlite should be wetted in a manner similar to that used in the treatment of charcoal as taught by the heretofore cited prior art. By the use of large particles of perlite (larger than 20 mesh) in place of the charcoal this may readily be accomplished as shown in the following example.

|  | Density, g./cc. | Porosity, Percent | Crush Strength, lb./in.² |
|---|---|---|---|
| Standard Mixture (i.e. with charcoal) | .255 | 89.2 | 390 |
| Perlite in place of Charcoal | .241 | 90.8 | 370 |

The standard mixture referred to above contained 92 gallons of lime slurry (520 pounds CaO—370 gallons of water), 215 pounds of Dicalite, 90 pounds of asbestos, 100 pounds of charcoal and 117 gallons of water. Dicalite is the trade name for a diatomaceous earth material manufactured by the Great Lakes Carbon Company. It has also been found advantageous to replace part or all of the diatomaceous earth material with perlite.

Although the foregoing invention has been described in some detail by way of illustration and example, for purposes of clarity and understanding it should be understood that certain changes and modifications may be practiced within the spirit of the invention as limited only by the scope of the following appended claims.

What is claimed is:

1. An acetylene container filler composition consisting essentially of a mixture of lime, expanded perlite, fibrous asbestos and water, according to the following formula:

|  | Percent by weight |
|---|---|
| Lime | 5 |
| Perlite | 14 |
| Fibrous asbestos | 4 |
| Water | 77 |

2. An acetylene container filler composition consisting essentially of a mixture of lime, expanded perlite, fibrous asbestos, water and diatomaceous earth, according to the following formula and multiples thereof:

| Lime-water slurry (14.4 wt. percent CaO) | gallons | 92 |
|---|---|---|
| Diatomaceous earth | pounds | 215 |
| Asbestos | do | 90 |
| Perlite | do | 100 |
| Water | gallons | 117 |

References Cited

UNITED STATES PATENTS

| 2,698,256 | 12/1954 | Shea et al. | 106—120 |
| 2,944,911 | 7/1960 | Muller et al. | 106—120 |
| 3,274,123 | 9/1966 | Coyne et al. | 106—120 |

JAMES E. POER, Primary Examiner

U.S. Cl. X.R.

106—120; 206—0.7; 252—446